United States Patent Office 3,553,017
Patented Jan. 5, 1971

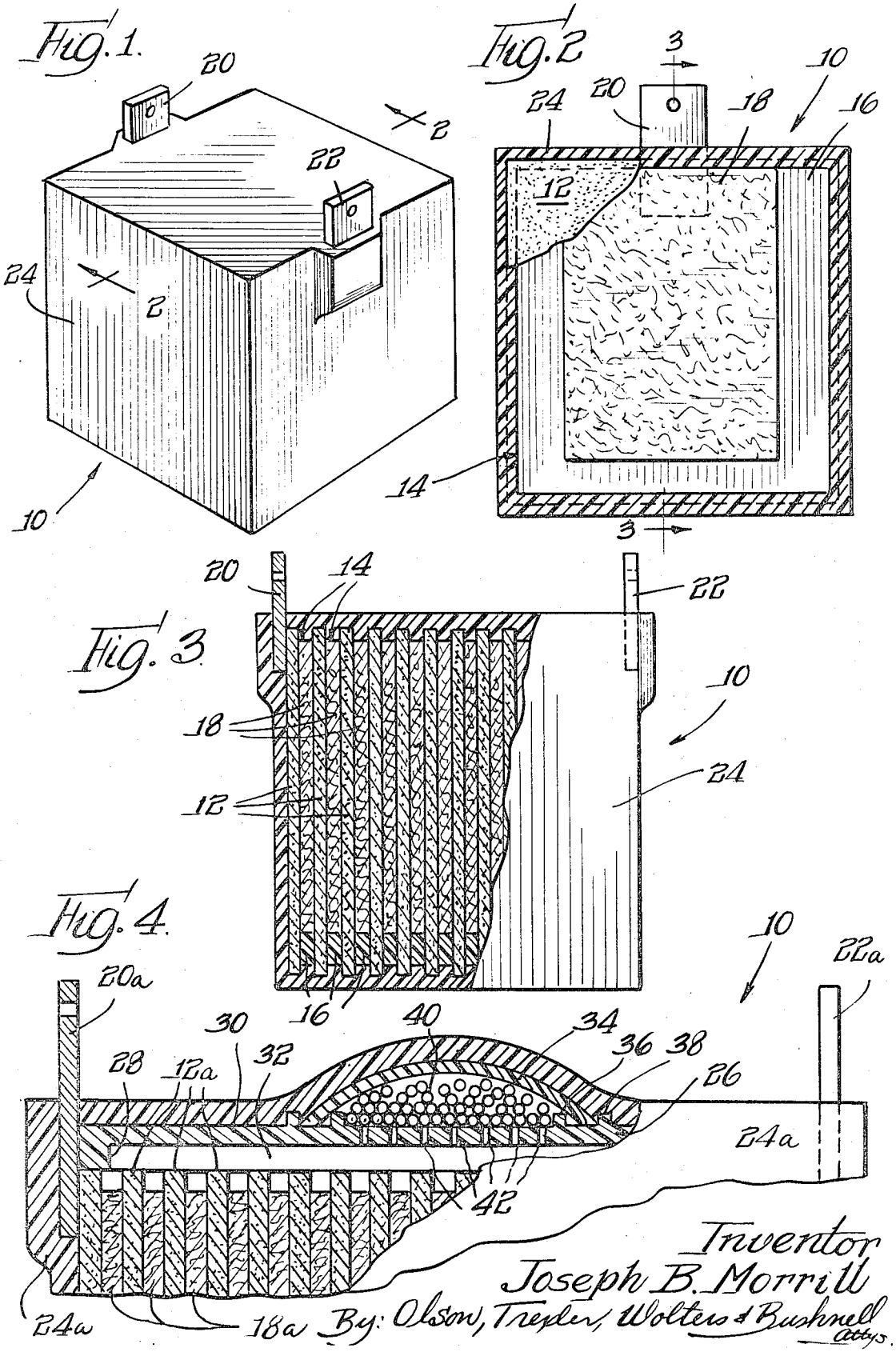

3,553,017
STORAGE BATTERY CONSTITUTING A CLOSED SYSTEM
Joseph B. Morrill, 831 E. Rosemary Road,
Lake Forest, Ill. 60045
Filed Sept. 2, 1966, Ser. No. 577,003
Int. Cl. H01m 35/00
U.S. Cl. 136—6    8 Claims

ABSTRACT OF THE DISCLOSURE

A storage battery constituting a closed system and having a pair of inert electrodes with electrolyte therebetween, wherein said electrolyte contains a metallic cation of intermediate oxidation state, the equilibrium of which with the corresponding metal and with a corresponding cation of higher oxidation state favors reduction of said cation of said higher oxidation state by said metal to said cation of intermediate oxidation state, said battery constituting a closed system isolating said electrodes and said electrolyte from oxidation-reduction sources external to said housing.

---

This invention relates generally to electrochemical power units and more particularly to storage batteries.

Numerous types of batteries have been developed in the past; and among these, secondary batteries have been generally characterized by comparatively low capacity per unit weight, lead-acid and nickel-iron batteries having capacities of about 15 watt-hours per pound and nickel-cadmium batteries having a capacity of about 10 watt-hours per pound. The advantage of these batteries is, of course, their ability to be recharged repeatedly.

An important object of the present invention is to provide a secondary battery which is characterized by a high capacity per unit weight.

Another object of the invention is to provide a storage battery in which either of the two terminals can be made the positive terminal when the device is being charged from its uncharged state.

Still another object of the invention is to provide a storage battery which can be completely sealed.

These and other objects and features of the invention will become more apparent from a consideration of the following descriptions.

The term "inert electrode" is used herein to mean an electrode whose materials of construction do not enter into the cell reaction of the battery in which it is incorporated.

A storage battery in accord with the invention includes a pair of inert electrodes laterally spaced apart by separator means which provide a diffusion pathway between the electrodes. A quantity of an electrolyte is disposed in the diffusion pathway, and this electrolyte comprises a metallic cation of intermediate oxidation state. The equilibrium of this latter cation with a corresponding cation of higher oxidation state and with the corresponding metal favors reduction of the cation of higher oxidation state by the metal to the cation of intermediate oxidation state.

In order that the principles of the invention may be readily understood, two physical embodiments thereof, but to which the application is not to be restricted, are shown in the accompanying drawing wherein:

FIG. 1 is a perspective view of a storage battery constructed in compliance with the present invention;

FIG. 2 is an enlarged, cross-sectional view taken substantially along the line 2—2 of FIG. 1;

FIG. 3 is a cross-sectional view taken substantially along the line 3—3 of FIG. 2; and FIG. 4 is an enlarged, fragmentary, partial sectional view similar to the showing of FIG. 3 but illustrating a modified form of the storage battery of the invention.

Referring now in detail to the drawing, specifically to FIGS. 1–3, a storage battery indicated generally by the reference numeral 10 is shown to comprise a plurality of inert electrodes 12 which are preferably fabricated as thin rectangular plates. The electrodes 12 are stacked in spaced-apart relationship, and separator units 14 are interposed between confronting faces of each adjacent pair of electrodes to establish the lateral distance therebetween. Each of these separator units comprises, as is best shown in FIG. 2, a generally U-shaped, insulating separator 16 and a porous sheet 18 that is located between the upright legs of the insulating separator. The sheet 18 provides a diffusion pathway for an electrolyte between confronting electrodes 12. In addition to the aforesaid mechanical components and the electrolyte, the storage battery 10 comprises a pair of electrically conductive terminals 20 and 22 which are disposed in electrical contact with the end electrodes of the stack. In addition, a polymeric encapsulation is arranged to enclose the described parts forming a rectangular housing 24 which extends over all six sides of the storage battery sealing the same against leakage of electrolyte and insuring intimate contact between the electrodes and the interposed porous sheets 18. Advantageously, the encapsulation of housing 24 is cast in place about the remaining components of the storage battery while the electrodes themselves are maintained under a compressive load. It is also desirable to form the U-shaped separators 16 from a polymer which is compatible with the material of housing 24.

Having thus described one construction of the storage battery of the invention, it is desirable now to describe more fully the materials of fabrication and the cooperation of the several components. The electrodes 12 are inert with respect to the cell reaction, and carbon has proved to be eminently useful in the construction of the electrodes. However, because of the stacked relationship of the electrodes and the corresponding piling of the individual cells defined thereby, it is imperative to avoid leakage of the electrolyte between adjacent cells. Accordingly, when carbon is used as a material of construction for the electrodes 12, it is desirable to render the electrodes impervious to the passage of liquid as by impregnating the individual electrodes with a compatible resin, phenol-aldehyde condensation products having proved useful in this latter regard.

As has been described hereinabove, the separators 16 are selected to be compatible with the encapsulation material of housing 24, and for these separators, such material as polyacrylates and polyolefins are contemplated. In addition, suitable strength and porosity have been provided in the sheet 18 by making it from such materials as filter paper, glass fabric and fabric woven from filaments of fluorocarbon polymers. It is appreciated that both woven and non-woven materials may be used for the sheet 18. The terminals 20 and 22 are fabricated from such materials as copper and aluminum.

The selected electrolyte is diffused through each of the sheets 18 until each sheet approaches saturation; and the electrically active ingredient of the electrolyte comprises a substance which readily dissociates in a polar solvent such as water. In compliance with an important feature of the invention, the electrolyte used in the storage battery 10 includes a metallic cation of intermediate oxidation state; and the equilibrium of this metallic cation of intermediate oxidation state with the corresponding metal and with a corresponding cation of higher oxidation state favors reduction of the cation of higher oxidation state by the metal to the cation of intermediate oxidation state. Thus, charging of the storage battery 10 produces a deposition of the metal on one electrode and simultaneously produces a valence change in the metallic cation of the electrolyte so that a portion thereof takes on a more highly oxidized state. Accordingly, when the storage battery 10 is charged and when a load circuit is completed between the terminals 20 and 22, the cell reaction will proceed spontaneously causing a current to flow in the external circuit. Suitable metals for use as cations in the electrolyte of the invention include antimony, chromium, iron and tin. Corresponding cell reactions, comprising the individual electrode reactions for the foregoing metals, are believed to be as follows:

(a)
$$Sb^{+++} + 3e^- = Sb$$
$$Sb^{+++} = Sb^{+++++} + 2e^-$$

(b)
$$Cr^{++} + 2e^- = Cr$$
$$2Cr^{++} = 2Cr^{+++} + 2e^-$$

(c)
$$Fe^{++} + 2e^- = Fe$$
$$2Fe^{++} = 2Fe^{+++} + 2e^-$$

(d)
$$Sn^{++} + 2e^- = Sn$$
$$Sn^{++} = Sn^{++++} + 2e^-$$

Various anions can be combined with the described cation for the electrolyte of the invention; and although chlorides are preferred, other comparatively stable anions can be used, for example sulfate.

Other constituents may be included in the electrolyte, such as plating promotors and buffers for regulating the relative acidity of the solution.

The storage battery of the invention has been found to exhibit a high electrical capacity per unit weight and is, in addition, useful in low current, continuous drain applications, the battery of the invention exhibiting a substantially constant voltage throughout an important portion of its discharge period. It finds utility in supplying motive power to cordless tools and appliances, radiosonds, sonobuoys, and systems for missiles and satellites. The storage battery of the invention is also convenient to charge since either terminal can be selected to serve as the positive terminal when the battery is in its uncharged state. Furthermore, the storage battery of the invention can be completely sealed without the need for venting. In the embodiment of FIGS. 1–3, evolution of gases during charging of the battery can be avoided merely by applying a comparatively slow charging rate to the unit.

In order that the invention may be more completely understood, a modified construction is illustrated in FIG. 4. Since the embodiment of FIG. 4 is similar in many respects to the embodiment of FIGS. 1–3, like numerals have been used to designate like parts with the suffix letter "a" being employed to distinguish those elements associated with the embodiment of FIG. 4.

The storage battery 10a of FIG. 4 is particularly characterized by its ability to withstand excessive charging rates without building up unacceptable pressure within the hermetic encapsulation defining the housing 24a. In particular, a plate structure 26 is comprised of a distal depending rim 28 and a planar member 30. The peripheral rim 28 is arranged to engage the opposite end electrodes 12a and opposite edge portions of the intermediate electrodes in order to space the planar member 30 above the top ends of the electrodes whereby to define a gaseous headspace 32 over the sheets 18a soaked with electrolyte.

In addition, a generally hemispherical vessel or dome 34 is positioned on top of the planar member 30 to be held in position by means of radially spaced, annular ribs 36 and 38. Between the dome 34 and the planar member 30, a particulate quantity 40 of the metal corresponding to the cation in the electrolyte is collected; and beneath dome 34, the planar member 30 is perforated with a suitable number of holes 42 which communicate the headspace 32 with the contents of the dome. Advantageously, the individual particles of metal in the quantity 40 are arranged to have a size greater than the orifice size of the holes 42 in order to prevent the metal particles from falling into contact with the other battery components. It has proved especially desirable to deposit the metal onto particles of an inert carrier such as beads of a ceramic material. In this latter case, the individual beads are selected to be of greater size than the orifice size of the holes 42. By the described arrangement, the particulate quantity 40 of metal is exposed to any gases that might be liberated from the electrolyte upon charging of the battery; and being so exposed, the metal is capable of reacting with these gases absorbing the same and avoiding a build-up of excessive pressure within the hermetic housing 24a.

The arrangement described with respect to FIG. 4 is especially advantageous when the original electrolyte is selected to be antimony trichloride. Overcharging of a battery using this material tends to liberate chlorine gas which, upon contact with particulate metal in the dome 34, reacts with the metal to form antimony pentachloride.

So that the present invention can be thoroughly understood, the following specific examples are given without, however, intending to limit the invention to the precise details and conditions set forth, except as required in the appended claims:

EXAMPLES

Eleven resin-impregnated carbon plates 1/64 inch thick and square in shape with an edge dimension of six inches were taken and stacked alternately with U-shaped separators of molded phenol-formaldehyde resin. Coarse filter paper sheets were situated between the upstanding legs of the separators; and the resulting unit was clamped together while an epoxy resin encapsulation was applied to all sides but the top. Thereafter, a water solution of antimony trichloride was infused into each filter paper element sheet. The solution thus infused as electrolyte contained approximately 38–42% by weight antimony trichloride and less than 2% by weight of antimony pentachloride. A charging current was applied to the end electrodes until the electrolyte solution contained approximately 29.7% by weight of antimony trichloride and 13.4% by weight of antimony pentachloride. Discharge tests were then conducted on the battery, and it was found that approximately 75 watt-hours of energy had been stored. The sample battery weighed approximately twelve ounces avoirdupois and, accordingly, exhibited a capacity of approximately 100 watt-hours per pound.

Similar batteries were constructed using water solutions of ferrous chloride, stannous chloride and chromous chloride as electrolytes. These batteries also took an acceptable charge.

The specific examples herein shown and described are to be considered primarily illustrative. Various changes beyond those suggested will, no doubt, occur to those skilled in the art; and such changes are to be understood as forming a part of this invention insofar as they fall within the spirit and scope of the appended claims.

The invention is claimed as follows:

1. A storage battery comprising: a housing; a series of electrodes within said housing, said electrodes being chemically inert with respect to the cell reactions of the battery and spaced apart in face-to-face relationship to define cell compartments therebetween, said series of electrodes including endmost electrodes acting as terminal connectors and at least one liquid impervious intermediate electrode functioning as anode in one adjacent cell compartment and cathode in the other adjacent cell compartment; terminals electrically connected to said endmost electrodes; separator means in each of said cell compartments providing a diffusion pathway between the electrodes thereof; and a quantity of an electrolyte in the diffusion pathway of each cell compartment, said electrolyte comprising a metal cation of intermediate oxidation state in equilibrium with the corresponding metal and with a corresponding metal cation of higher oxidation state, which state of equilibrium favors reduction of said cation of higher oxidation state by said metal to said cation of intermediate oxidation state with a release of electrical energy, said housing constituting a closed system isolating said electrodes and said electrolyte from energy interchange with chemical oxidation-reduction sources external to said housing whereby said terminals serve as the sole means of electrically charging and discharging said battery.

2. A storage battery according to claim 1 wherein said metallic cation of intermediate oxidation state is selected from the class consisting essentially of the ions of antimony, chromium, iron and tin.

3. A storage battery according to claim 1 which further comprises vessel means; a particulate quantity of said metal in said vessel means; and structure means connected to said vessel means and arranged with said electrodes to define space means over said separator means, said structure means being perforated to communicate said space means with said particulate quantity of metal, whereby said particulate quantity of metal is exposed to gases liberated from said electrolyte upon charging of said battery for absorbing reaction therewith.

4. A storage battery according to claim 3 wherein said electrolyte further includes chloride ion and wherein said metal is antimony.

5. A storage battery according to claim 1 wherein said electrodes are impervious carbon electrodes and wherein said electrolyte is a water solution of antimony trichloride.

6. A storage battery according to claim 1 wherein said electrodes are impervious carbon electrodes and wherein said electrolyte is a water solution of ferrous chloride.

7. A storage battery according to claim 1 wherein said electrodes are impervious carbon electrodes and wherein said electrolyte is a water solution of stannous chloride.

8. A storage battery according to claim 1 wherein said electrodes are impervious carbon electrodes and wherein said electrolyte is a water solution of chromous chloride.

References Cited

UNITED STATES PATENTS

| | | | |
|---|---|---|---|
| Re. 11,238 | 4/1892 | Roberts | 136—22 |
| 2,131,592 | 9/1938 | Lange et al. | 136—179 |
| 2,465,202 | 3/1949 | Craig | 136—179 |
| 2,687,449 | 8/1954 | Gulick et al. | 136—179 |
| 3,000,996 | 9/1961 | Usel | 136—9 |
| 3,110,630 | 11/1963 | Wolfe, Jr. | 136—154 |
| 3,245,890 | 4/1966 | Klass | 204—79 |
| 3,009,327 | 11/1961 | Weil | 136—86 X |
| 3,032,600 | 5/1962 | Mayer | 136—6 |
| 3,092,516 | 6/1963 | Rightmire, I | 136—86 |
| 3,100,163 | 8/1963 | Lyons, Jr. | 136—86 |
| 3,152,013 | 10/1964 | Juda | 136—86 |
| 3,288,641 | 11/1966 | Rightmire, II | 136—6 |
| 3,360,401 | 12/1967 | Grasselli et al. | 136—86 |

WINSTON A. DOUGLAS, Primary Examiner

A. SKAPARS, Assistant Examiner

U.S. Cl. X.R.

136—179